United States Patent
Sugimoto et al.

(10) Patent No.: US 11,203,957 B2
(45) Date of Patent: Dec. 21, 2021

(54) HEAD COVER FOR ENGINE

(71) Applicant: KUBOTA Corporation, Osaka (JP)

(72) Inventors: Satoshi Sugimoto, Sakai (JP); Takayuki Ichikawa, Sakai (JP); Shota Hatada, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 17/096,529

(22) Filed: Nov. 12, 2020

(65) Prior Publication Data

US 2021/0199032 A1 Jul. 1, 2021

(30) Foreign Application Priority Data

Dec. 31, 2019 (JP) .............................. JP2019-240095

(51) Int. Cl.
*F01M 13/04* (2006.01)
(52) U.S. Cl.
CPC .... *F01M 13/0405* (2013.01); *F01M 13/0416* (2013.01)
(58) Field of Classification Search
CPC ................. F01M 13/0405; F01M 13/0416
See application file for complete search history.

(56) References Cited

U.S. PATENT DOCUMENTS 5,069,192 A * 12/1991 Matsumoto ............ F01M 13/02
123/572
2016/0169171 A1 6/2016 Newman et al.
2017/0370256 A1 12/2017 Tokunaga et al.
2018/0171840 A1* 6/2018 Isoshima ................ F01M 13/04
2019/0017420 A1* 1/2019 Kashiwabara ......... F01M 13/04

FOREIGN PATENT DOCUMENTS

| DE | 102004002641 A1 | 8/2005 |
| EP | 2910761 A1 | 8/2015 |
| JP | S61266150 A | 11/1986 |
| JP | S62-188510 U | 12/1987 |
| JP | 2018-003628 A | 1/2018 |

OTHER PUBLICATIONS

Extended European Search Report dated Apr. 12, 2021 in European Application No. 20203356.9.

* cited by examiner

*Primary Examiner* — Jacob M Amick
*Assistant Examiner* — Charles J Brauch
(74) *Attorney, Agent, or Firm* — Panitch Schwarze Belisario & Nadel LLP (57) ABSTRACT

The head cover for an engine includes a gas passage in the head cover, a gas outlet formed on a head cover wall at a terminal end portion of the gas passage in the head cover, a gas intermediate outlet portion formed in the head cover wall so as to face space inside the head cover except the gas passage in the head cover, and a gas intermediate inlet portion formed in the head cover wall so as to face the gas passage in the head cover, in which an opening specification in which through holes penetrating the head cover wall are formed and a closing specification in which the through holes are not formed can be selected for the gas intermediate outlet portion and the gas intermediate inlet portion.

19 Claims, 8 Drawing Sheets

FIG. 8

HEAD COVER FOR ENGINE

CROSS-REFERENCE TO RELATED APPLICATION

This application claims priority under 35 U.S.C. § 119(b) to Japanese Patent Application No. 2019-240095, filed Dec. 31, 2019, the disclosure of which is incorporated herein by reference in its entirety.

BACKGROUND OF THE INVENTION

Field of the Invention

The present invention relates to a head cover for an engine.

Description of Related Art

Many of the engines including a blow-by gas recirculation device have a structure in which blow-by gas from a crankcase is taken out of the engine through a head cover and then is returned to an intake passage. In this case, a gas passage in the head cover formed inside the head cover is usually equipped with an oil separator (oil filter) for removing an oil component in the blow-by gas. As described above, a structure having a so-called interior oil separator is known.

Further, there is also an engine that adopts a structure in which an oil separator is provided as a dedicated part outside a head cover, that is, an exterior oil separator. The exterior oil separator is advantageous in that a large exterior oil separator with sufficient capacity can be installed because of loose restrictions on the arrangement space.

In other words, even though the capacity of an interior oil separator is limited, the interior oil separator has the advantage that a blow-by gas recirculation device can be compactly integrated. For an exterior oil separator, even though it has a sufficient capacity, there are disadvantages that severe restrictions are imposed on arrangement and the engine is bulky. Conventionally, an interior oil separator or an exterior oil separator has been selected according to various conditions such as the size and the installed model of the engine.

For example, for certain series engines with identical or slightly different displacements, depending on the type of agricultural machine on which the engine is installed and how the engine is used in the destination country, both an interior oil separator specification and an exterior oil separator specification may be set even though the engines are basically identical. Since blow-by gas piping arrangement in a head cover differs greatly between these two specifications, head covers suitable for the respective specifications are required.

Therefore, two types of head cover molds are also required, and there is room for improvement in that the production cost and the cost as a product will be high since the mold cost is doubled although the engines are basically identical.

SUMMARY OF THE INVENTION

An object of the present invention is to provide a head cover for an engine improved so as to reduce the cost by reducing the mold cost by making it possible to standardize head covers for an engine with a head cover interior oil separator specification and an engine with an engine exterior oil separator specification by devising the structure.

In the present invention, there are provided
a gas passage in the head cover that guides blow-by gas from a crankcase to an intake passage,
a gas outlet that is formed in a head cover wall at a terminal end portion of the gas passage in the head cover,
a gas intermediate outlet portion that is formed in the head cover wall so as to face the space inside the head cover except the gas passage in the head cover, and
a gas intermediate inlet portion that is formed in the head cover wall so as to face the gas passage in the head cover.

An opening specification in which through holes are formed to penetrate the head cover wall so as to enable blow-by gas supply and discharge passages to communicate with and connect to the engine exterior oil separator and a closing specification in which the through holes are not formed so that an oil separator can be arranged on an inner side of the head cover wall can be selected for at least one of the gas intermediate outlet portion and the gas intermediate inlet portion.

According to the present invention, each of the gas intermediate outlet portion and the gas intermediate inlet portion formed in the head cover has a structure in which the presence or absence of a through hole for communicating the inside and the outside can be selected. Therefore, the opening specification in which through holes are formed to penetrate the head cover wall so as to enable the blow-by gas supply and discharge passages to communicate with and connect to the engine exterior oil separator, and the closing specification in which the through holes are not formed so that the oil separator can be arranged on the inner side of the head cover wall can be selected for the gas intermediate outlet portion and the gas intermediate inlet portion.

In other words, although there are two types of head covers with different structures, that is, the opening specification and the closing specification, only one type of mold is required for molding. Whether or not there is a through hole can be determined depending on whether or not there is post-processing, and machining such as making a hole is extremely easy and inexpensive.

As a result, the head cover for an engine improved so as to reduce the cost by reducing the mold cost by making it possible to standardize head covers for an engine with a head cover interior oil separator specification and an engine with an engine exterior oil separator specification can be provided.

BRIEF DESCRIPTION OF THE DRAWINGS

FIGS. 7A and 7B illustrate the principle structure of a blow-by gas recirculation device at a head cover part.

DETAILED DESCRIPTION OF PREFERRED EMBODIMENTS

Hereinafter, embodiments of a head cover for an engine according to the present invention will be described with reference to the drawings of head covers of industrial diesel engines each having a blow-by gas recirculation device applied to an agricultural tractor or the like.

Figure 1:
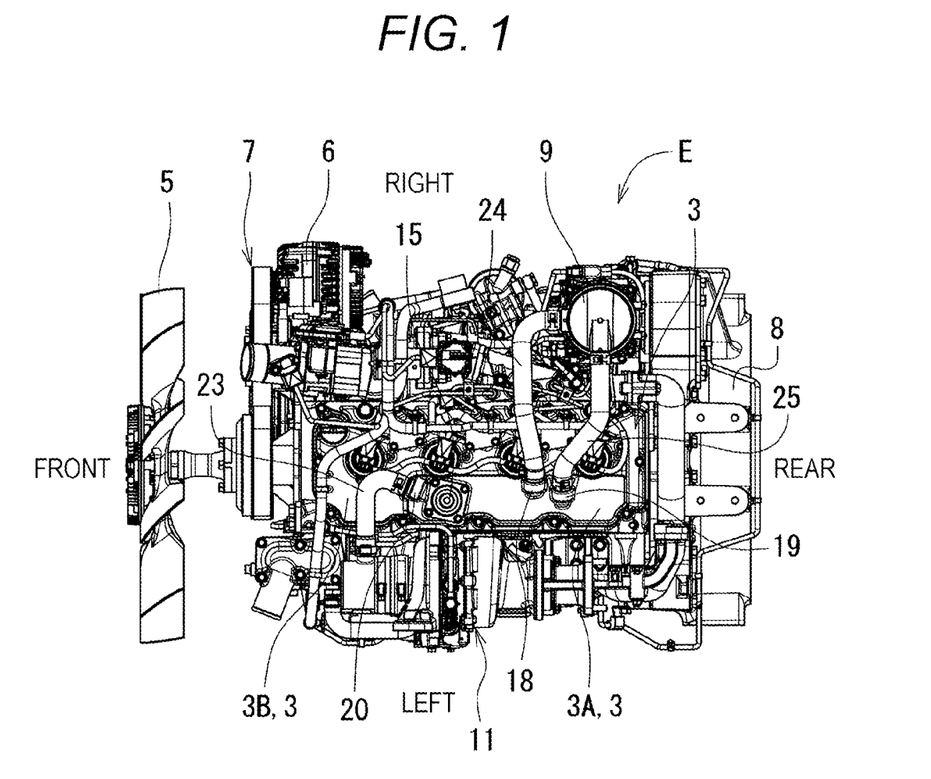
FIG. 1 is a plan view of an industrial diesel engine.
Figure 2:
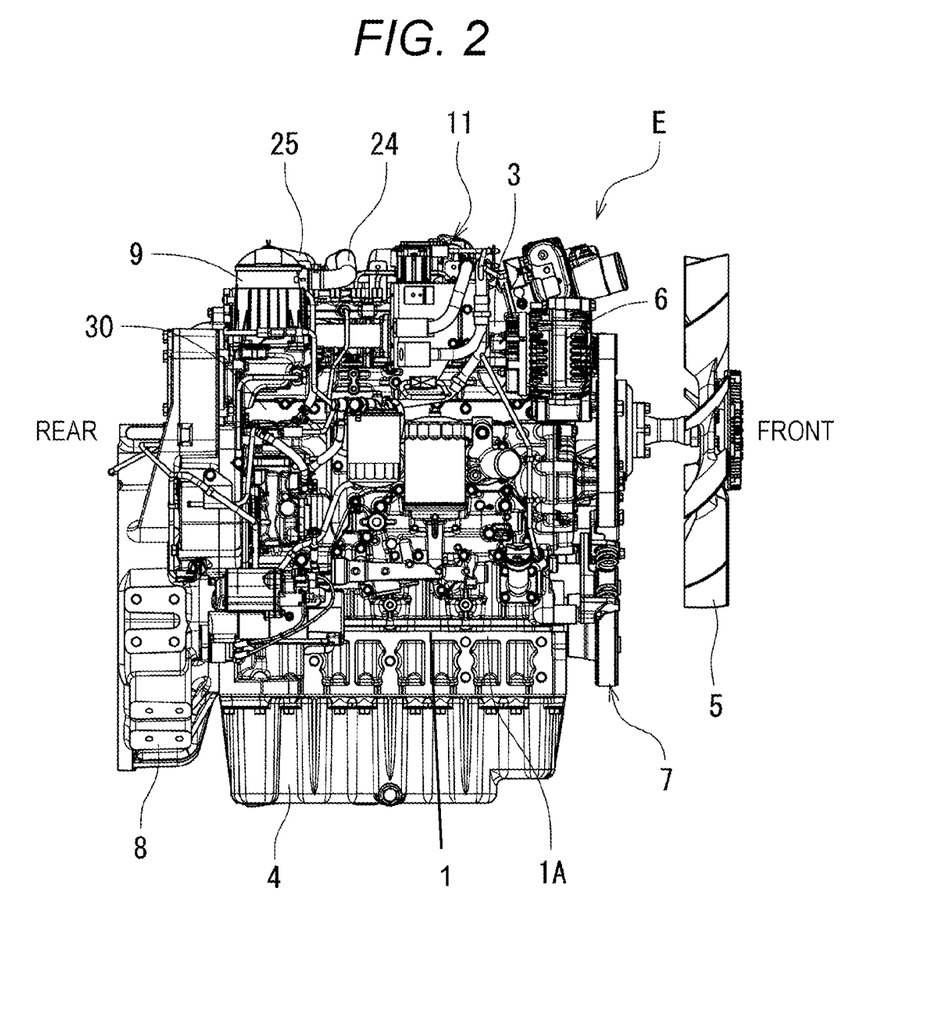
FIG. 2 is a right side view of the engine in FIG. 1.
Figure 3:
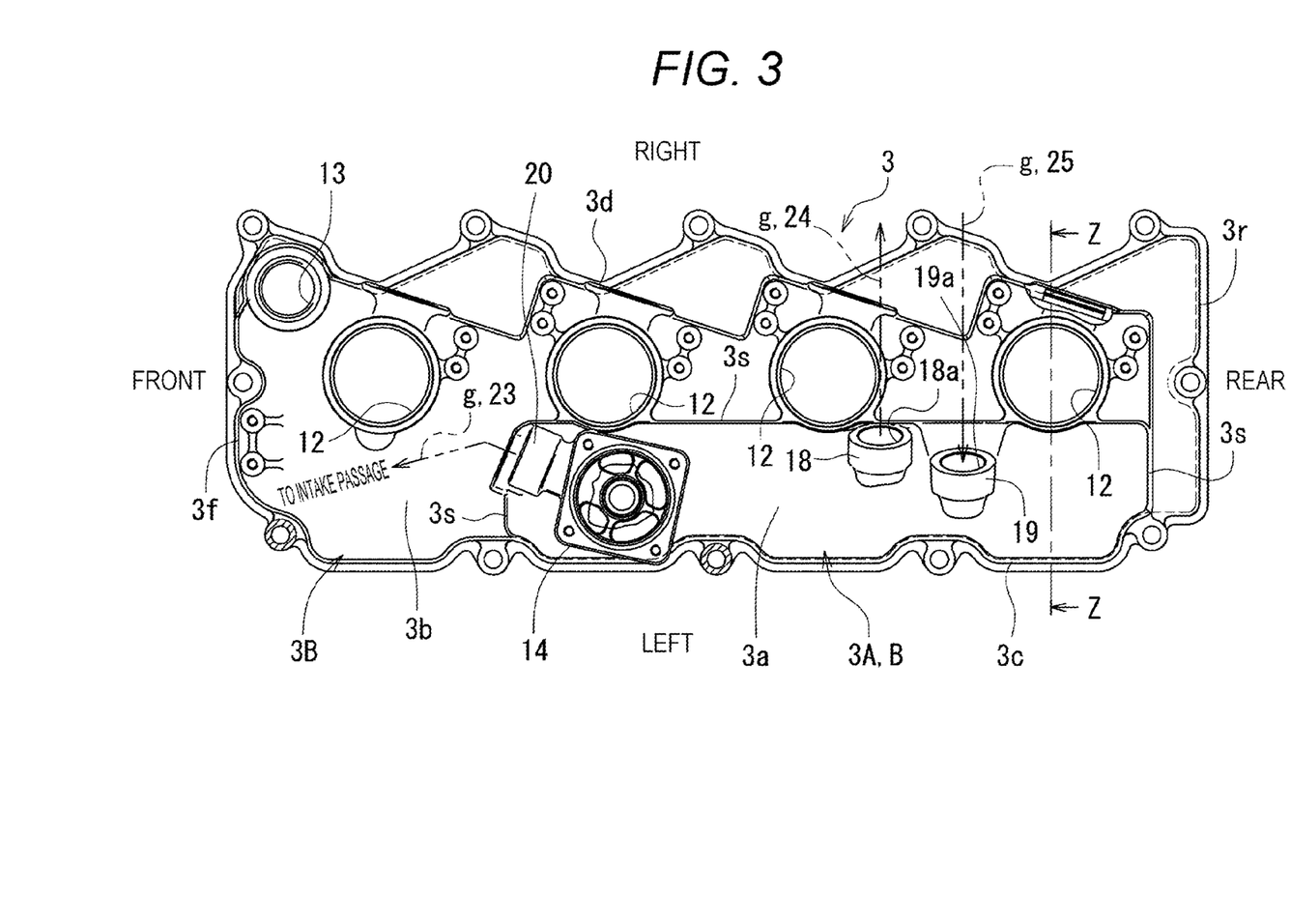
FIG. 3 is a plan view of a head cover.
Figure 4:
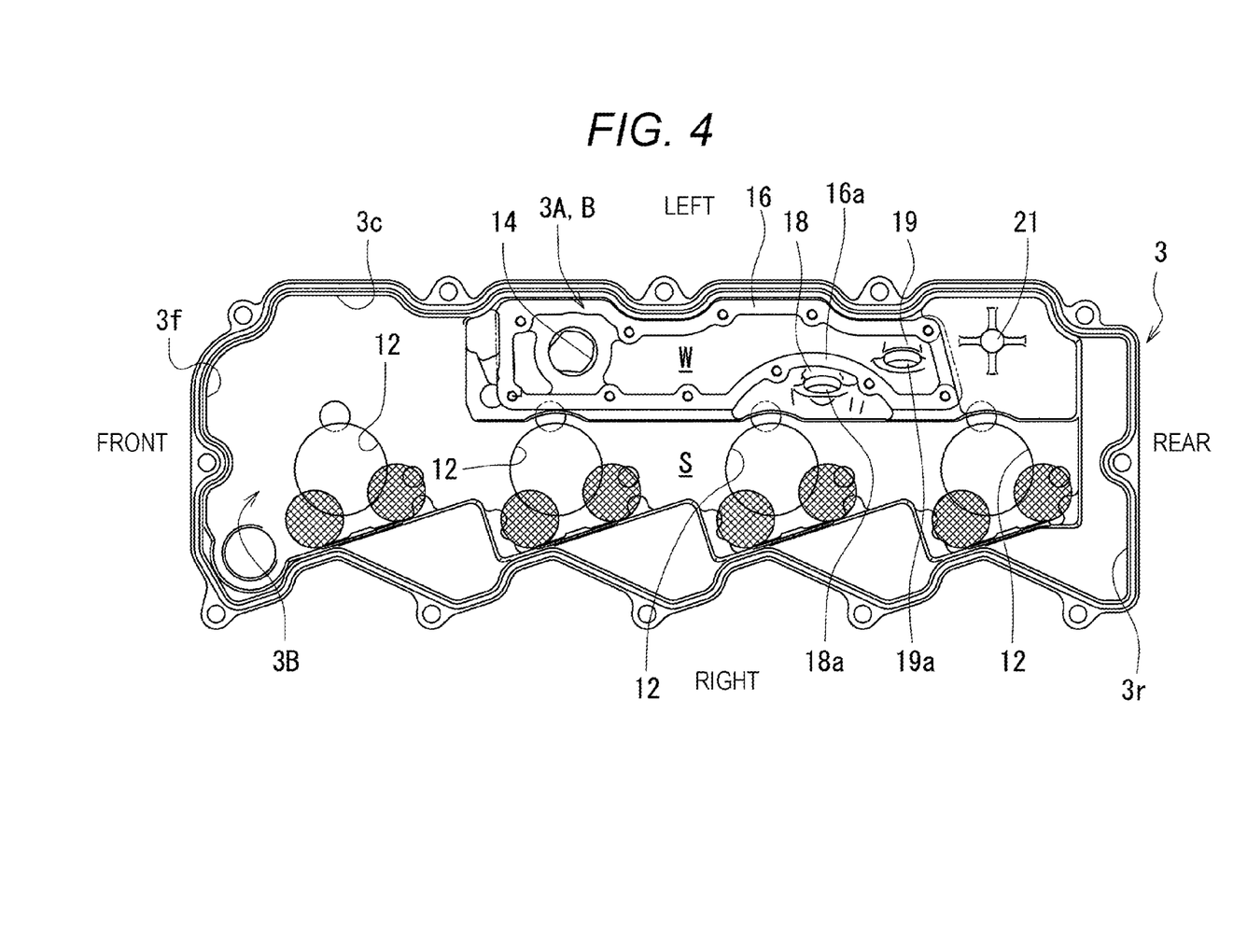
FIG. 4 is a bottom view of the head cover in FIG. 3.
Figure 5:
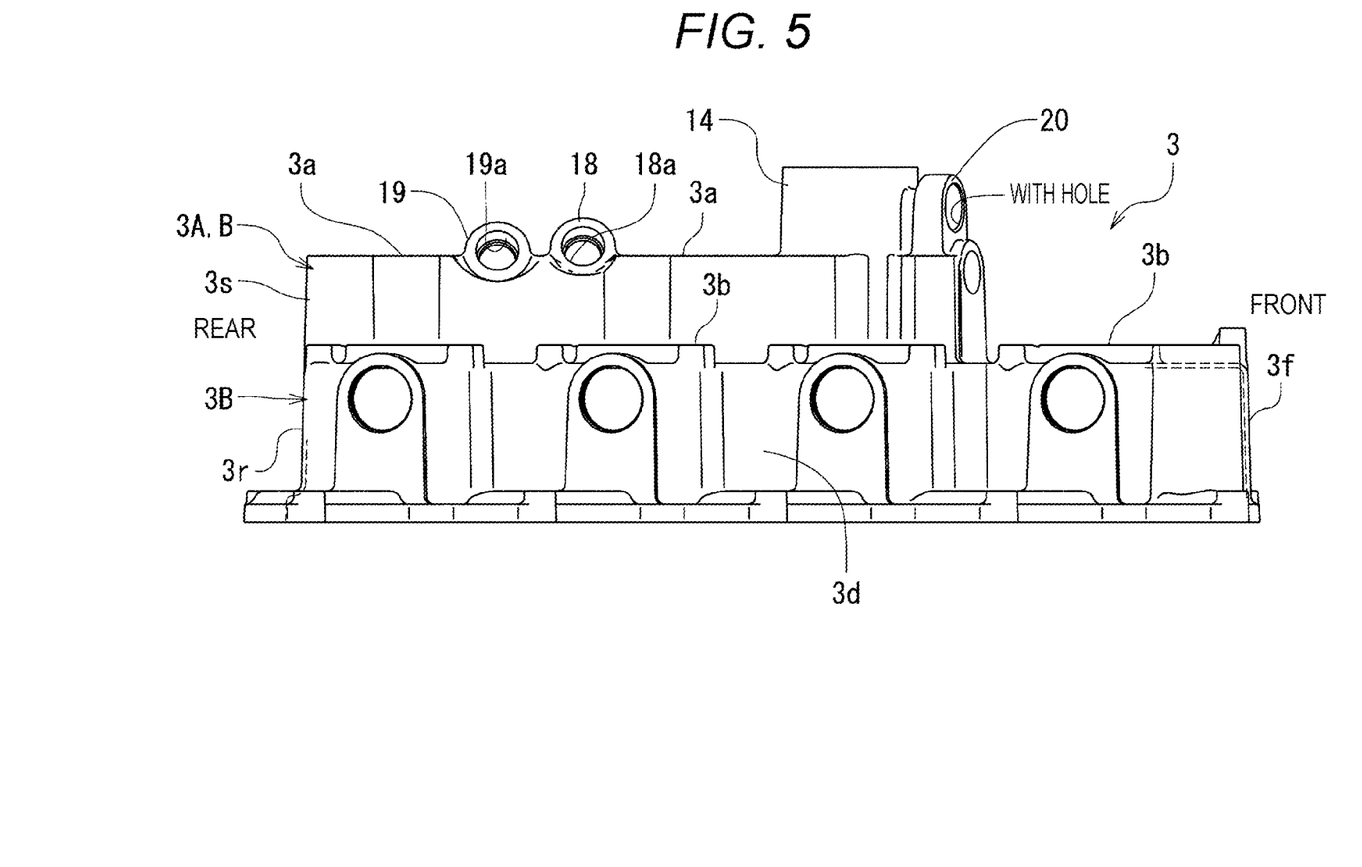
FIG. 5 is a right side view of the head cover in FIG. 3.
Figure 6:
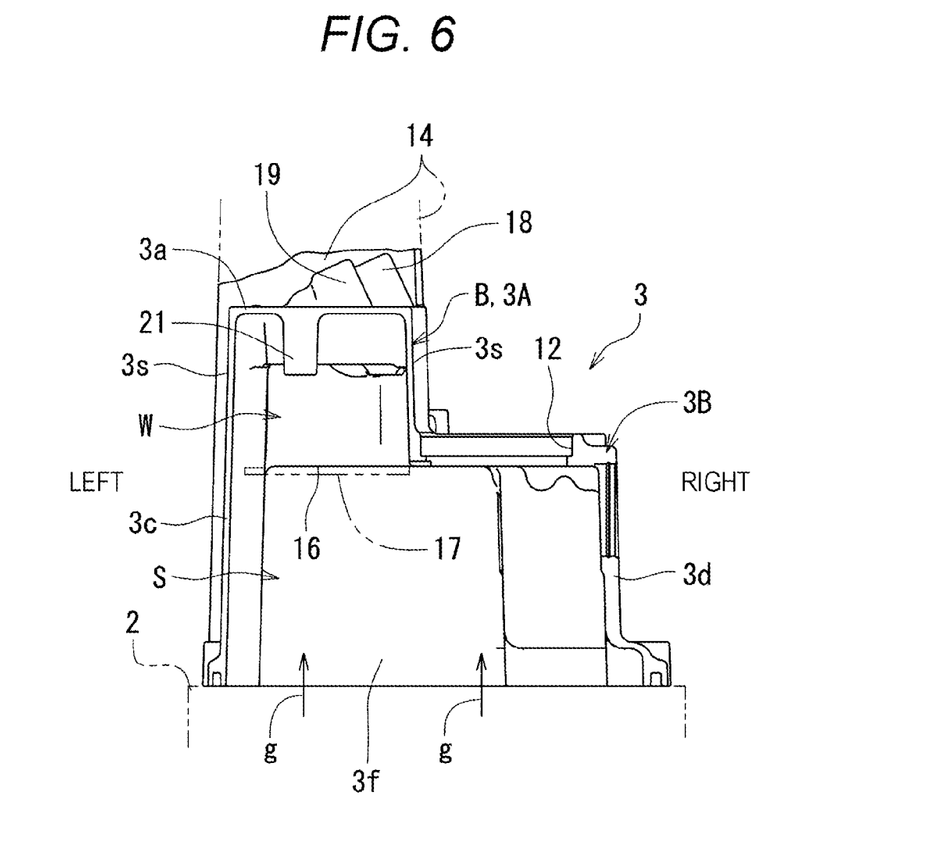
FIG. 6 is a cross-sectional view taken along line Z-Z in the head cover of FIG. 3.

FIGS. 1 and 2 illustrate an in-line 4-cylinder industrial diesel engine (hereinafter simply abbreviated as "engine") E with a blow-by gas recirculation device. In this engine E, a cylinder head 2 is assembled on a cylinder block 1, and a head cover (head cover for an engine) 3 is assembled on the cylinder head 2. The lower part of the cylinder block 1 is a crankcase 1A, and an oil pan 4 is assembled under the crankcase 1A.

A cooling fan 5, an alternator (sel-dynamo) 6, a belt transmission mechanism 7, and the like are arranged in the front part of the engine E, and a flywheel housing 8 is provided in the rear part of the engine E. The alternator 6, an intake manifold 30, an oil separator (engine exterior oil separator) 9, and the like are arranged on the right side of the engine E, and an intake manifold (notation is omitted), a turbocharger (turbo) 11, an EGR cooler (notation is omitted), and the like are arranged on the left side of the engine E.

The engine E has a specification (engine exterior oil separator specification, hereinafter referred to as a "separator exterior specification") in which an oil separator 9 for removing an oil component in blow-by gas is arranged as a dedicated part on the outside of the head cover 3. Although not illustrated, an engine with a specification (head cover interior oil separator specification, hereinafter referred to as a "separator interior specification") in which an oil separator is inside an head cover is also set because the engine is basically identical to the engine E but differs from the engine E in details (for example, displacement thereof is slightly larger or smaller, power thereof is different, or the like).

[Regarding Head Cover 3 with Separator Exterior Specification]

In the engine E (engine illustrated in FIGS. 1 and 2) with the separator exterior specification, a blow-by gas outlet (gas intermediate outlet portion) and a blow-by gas inlet (gas intermediate inlet portion) for the exterior oil separator 9 needs to be provided in the head cover 3. However, such an outlet and an inlet are not required for the head cover in the engine with the separator interior specification. Therefore, it is a conventional technical common sense that a mold for molding is required for each of the head cover 3 with the separator exterior specification and a head cover 33 with the separator interior specification (see FIG. 8) since the head cover 3 and the head cover 33 are separate components.

In contrast, in the present invention, it has succeeded in making it possible to mold the head covers 3, 33 of the respective specifications with one mold mainly by devising structure regarding the gas intermediate outlet portion and the gas intermediate inlet portion. Next, the head cover obtained by devising the structure as described above will be described by using the head cover 3 with the separator exterior specification.

As illustrated in FIGS. 3 to 6, the head cover 3 used for the engine E with the separator exterior specification is a bottomless box-shaped part with a stage provided with a protruding cover portion 3A formed by protruding a portion of the upper left portion upward and a main cover portion 3B. The protruding cover portion 3A has a cover ceiling wall 3a and a peripheral wall 3s, and the internal space thereof is a gas passage W in the head cover for passing blow-by gas. The main cover portion 3B has a cover upper wall 3b, a cover front wall 3f, a cover rear wall 3r, a cover left wall 3c, and a cover right wall 3d, and the internal space thereof is a valve chamber S in which a valve operating mechanism (not illustrated) such as a rocker arm is arranged.

In FIGS. 3 to 6, reference symbol 12 denotes an injector hole, reference symbol 13 denotes an oil filler port hole, and reference symbol 14 denotes an upright wall formed at the front end portion of the protruding cover portion 3A where a pressure regulating valve 15 (PCV valve or the like, see FIG. 1) is provided. A substantially loop-shaped mounting seat 16 that faces downward and is long in the front-rear direction is formed at an inner bottom section of the protruding cover portion 3A (see FIG. 4). In the actual engine, a partition plate 17 is bolted to the mounting seat 16. The partition plate 17 is a bottom plate member that separates the gas passage W in the head cover, which is a passage for blow-by gas, from the valve chamber S in order to separate (isolate) the gas passage W in the head cover.

That is, the gas passage W in the head cover in the separator exterior specification is formed in the head cover 3 as the internal space of a box-shaped structure B configured of the protruding cover portion 3A (the cover ceiling wall 3a and the peripheral wall 3s) and the partition plate 17. Note that in a simple-shaped head cover that does not have the protruding cover portion 3A, the box-shaped structure B may be formed so as to protrude downward from the head cover wall such as the cover upper wall 3b (see FIG. 7A), or of course, may have a configuration of including a protruding cover portion 3A.

At a location slightly closer to the rear in the center portion in the front-rear direction of the cover ceiling wall 3a of the protruding cover portion 3A, the gas intermediate outlet portion 18 having a through hole 18a formed in the outlet side and communicating with the valve chamber S and a gas intermediate inlet portion 19 having a through hole 19a in the inlet side and communicating with the gas passage W in the head cover are formed. A right vertical seat portion 16a in the mounting seat 16, the right vertical seat portion 16a corresponding to the gas intermediate outlet portion 18, is formed in a shape that is recessed to the left in a large arc shape, and the right and left width of the portion of the gas passage W in the head cover corresponding to the right vertical seat portion 16a is compressed to the left.

In the gas intermediate outlet portion 18 and the gas intermediate inlet portion 19, which are inclined structures, the through hole 18a on the outlet side and the through hole 19a on the inlet side which are laterally oblique and having an inclination connecting the upper right and the lower left are formed respectively, by machining, that is, post-processing after the material of the head cover 3 is molded. The gas intermediate outlet portion 18 is arranged slightly to the right of the gas intermediate inlet portion 19 on the rear side in order to open the through hole 18a on the outlet side to the valve chamber S.

A supply passage 24 having a tubular shape for sending blow-by gas to the oil separator 9 is connected to the gas intermediate outlet portion 18, and a discharge passage 25 having a tubular shape for sending blow-by gas from the oil separator 9 to the head cover 3 is connected to the gas intermediate inlet portion 19. The through hole 19a on the inlet side is arranged and formed so as to face a start end portion (rear end portion) of the gas passage W in the head cover. That is, the gas intermediate outlet portion 18 is set to face the outside of the box-shaped structure B, and the gas intermediate inlet portion 19 is set to face the inside of the box-shaped structure B.

A gas outlet 20 for sending blow-by gas that has passed through the pressure regulating valve 15 to a turbocharger (an example of the intake passage) 11 is formed in the cover ceiling wall 3a on the front side of the upright wall 14. A recirculation duct 23 connected to the compressor side of the turbocharger 11 is connected to the gas outlet 20 in the posture of facing obliquely forward to the right. The pressure regulating valve 15 and the upright wall 14 are arranged at the terminal end portion (front end portion) of the gas passage W in the head cover.

Figure 7A:
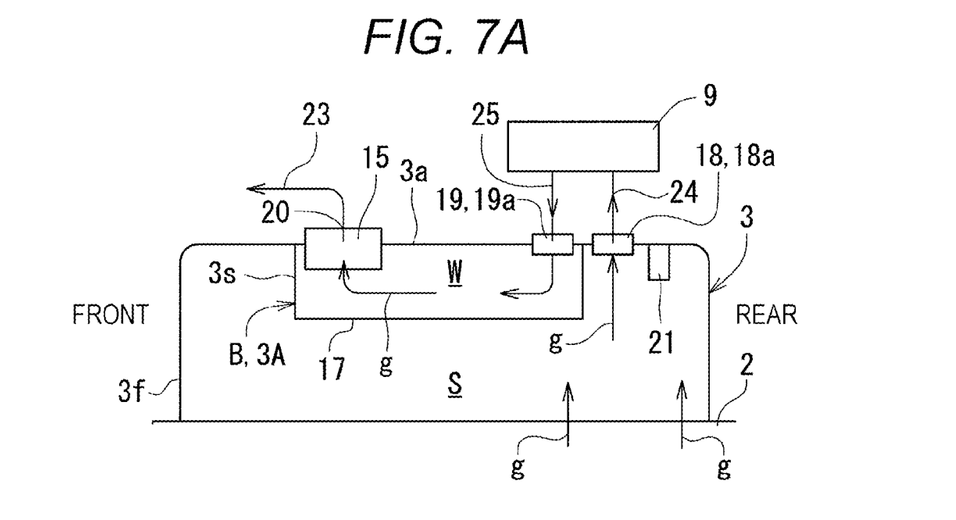
FIG. 7A is a schematic diagram of a separator exterior specification.

In the engine with the separator exterior specification, as illustrated in a schematic diagram in FIG. 7A, blow-by gas g coming up from the cylinder head 2 passes through the valve chamber S, then passes through the gas intermediate outlet portion 18 and the supply passage 24, and enters the oil separator 9. The blow-by gas g from which an oil component has been removed by the oil separator 9 passes through the discharge passage 25 and the gas intermediate inlet portion 19, and enters the gas passage W in the head cover where the blow-by gas g also undergoes a slight oil removing action while flowing. Then, the blow-by gas g passes through the pressure regulating valve 15 and the gas outlet 20, and is sent out to the recirculation duct 23.

[Regarding Head Cover with Separator Interior Specification]

Figure 7B:
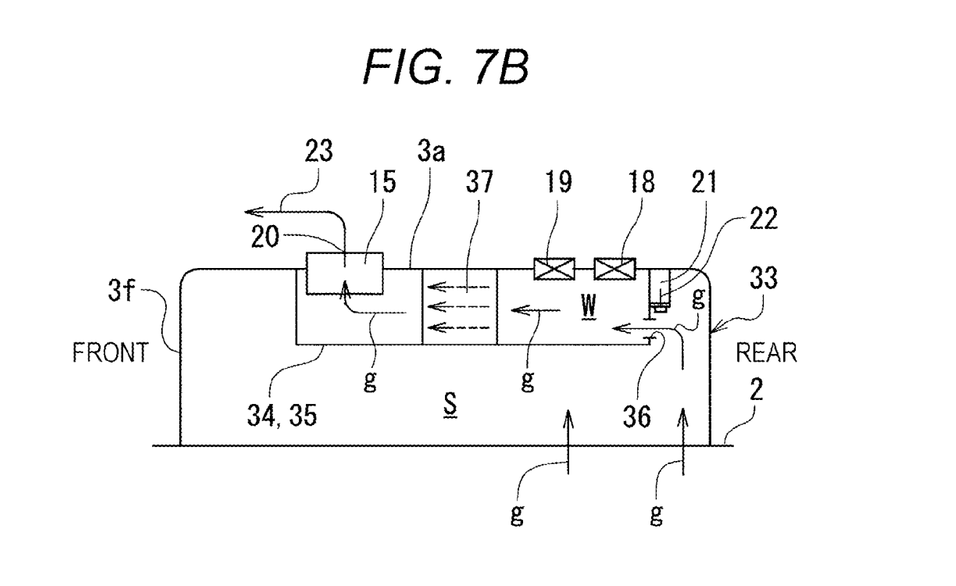
FIG. 7B is a schematic diagram of a separator interior specification.
Figure 8:
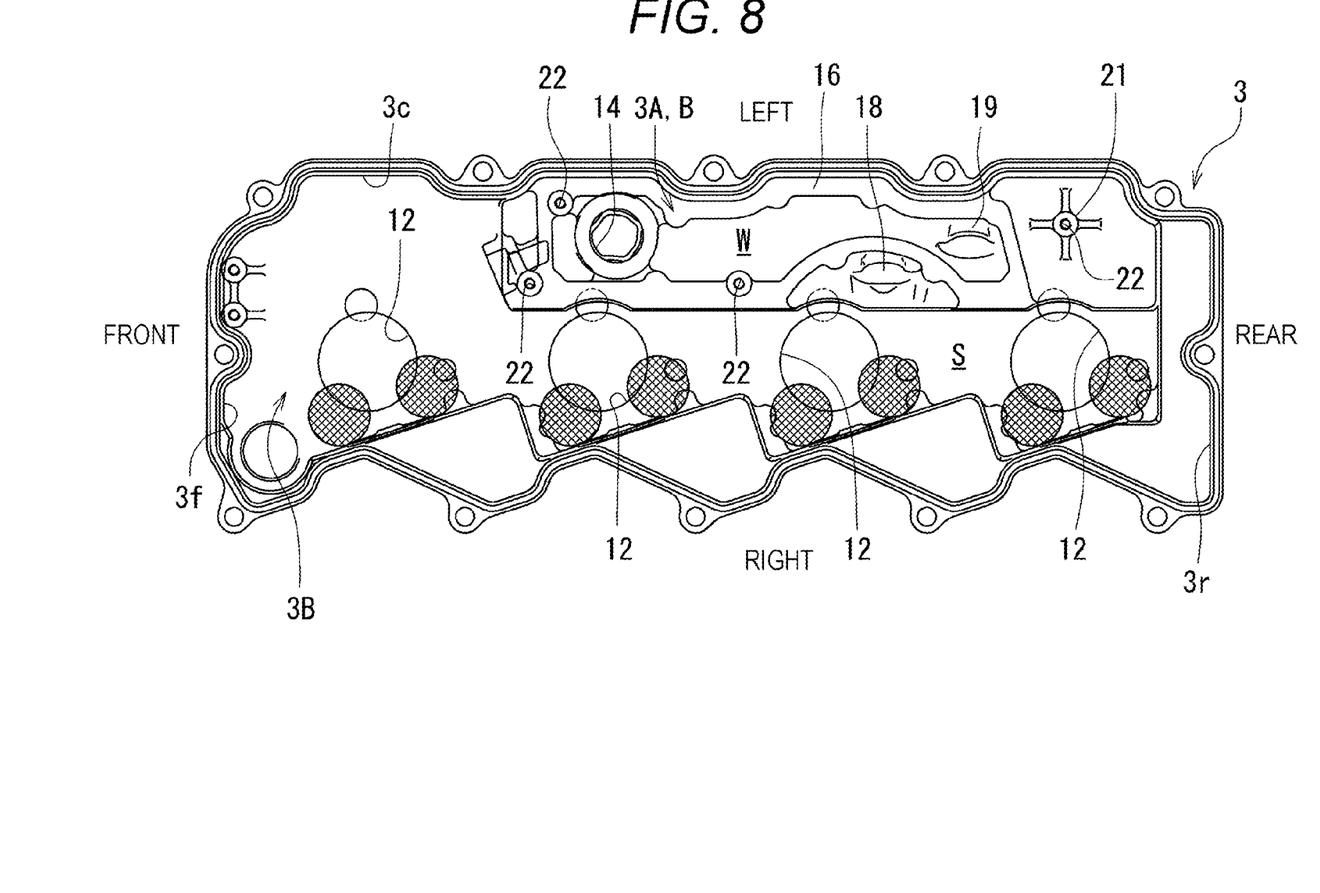
FIG. 8 is a bottom view of a head cover for an engine with the separator interior specification.

As illustrated in FIGS. 7B and 8, in the head cover 33 of the engine (not illustrated) with the separator interior specification, a boss portion 21 in which a female thread portion 22 for screwing a gas passage forming member 34 (or 35) in the head cover with the closing specification is formed is provided upstream of a gas intermediate outlet portion 18 in the cover ceiling wall 3a in the blow-by gas flow direction. The boss portion 21 (see FIG. 8) is also provided in the head cover 3 with the separator exterior specification (see FIG. 4).

Through holes 18a, 19a are not post-processed in the gas intermediate outlet portion 18 and the gas intermediate inlet portion 19 and remain as cast surfaces, that is, are closed, and the female thread portion 22 is formed in the boss portion 21 by post-processing. Three female thread portions 22 are also provided at appropriate locations in a mounting seat 16 by post-processing. Therefore, by using a total of four female thread portions 22, a bottom plate member 34 for forming a gas passage W in the head cover, or a small oil separator (or blow-by gas passage structure with a built-in separator) 35 which is a dedicated part and has a gas outlet and a gas inlet facing the inside of an upright wall 14 can be provided inside the head cover 3.

In an engine with the separator interior specification, as illustrated in a schematic diagram in FIG. 7B, the route is as follows. Blow-by gas g from a cylinder head 2 enters a gas inlet 36 of the gas passage W in the head cover formed by the bottom plate member 34 or the small oil separator 35. The blow-by gas g from which an oil component has been removed by an oil filter (or an oil separator) 37 passes through a pressure regulating valve 15 and the gas outlet 20 to go outside. Since the gas intermediate outlet portion 18 and the gas intermediate inlet portion 19 are closed, the separate gas inlet 36 is required. Note that the small oil separator 35 has a gas outlet, not illustrated.

As described above, upon molding each of the head covers 3, 33 is in a state of being integrally formed with the gas intermediate outlet portion 18 and the gas intermediate inlet portion 19 having no through holes 18a, 19a and the boss portion 21 having no female thread portion 22. In this state, the head cover 3 with the separator exterior specification and the head cover 33 with the separator interior specification are exactly the same parts, and therefore only one type of mold is required. If the through hole 18a of the gas intermediate outlet portion 18 and the through hole 19a of the gas intermediate inlet portion 19 are formed by post-processing in the head cover that has not been processed (not machined) in a molded state to adopt the opening specification, the head cover 3 with the separator exterior specification can be obtained. Then, if the female thread portion 22 is post-processed in the boss portion 21 to adopt the closing specification in which the through holes 18a, 19a are not formed, the head cover 33 with separator interior specification can be obtained.

That is, when viewed as the separator exterior specification, the head cover 3 includes the gas passage W in the head cover that guides blow-by gas from the crankcase 1A to the intake passage 11, the gas outlet 20 that is formed in the cover ceiling wall (head cover wall) 3a at the terminal end portion of the gas passage W in the head cover, the gas intermediate outlet portion 18 that is formed in the cover ceiling wall (head cover wall) 3a in the state of facing the valve chamber (space inside the head cover except the gas passage W in the head cover) S, and the gas intermediate inlet portion 19 that is formed in the cover ceiling wall (head cover wall) 3a in the state of facing the gas passage W in the head cover.

Then, the opening specification in which the through holes 18a, 19a are formed to penetrate the cover ceiling wall (head cover wall) 3a so as to enable the blow-by gas supply and discharge passages 24, 25 to communicate with and connect to the engine exterior oil separator 9, and the closing specification in which the through holes 18a, 19a are not formed so that the oil separator can be arranged on the inner side of the cover ceiling wall (head cover wall) 3a can be selected for at least one of the gas intermediate outlet portion 18 and the gas intermediate inlet portion 19.

Therefore, the two types of head covers 3, 33, which are engines for which the separator exterior specification and the separator interior specification are set according to conditions such as the engine displacement and usage conditions in the destination country and whose finish configurations are different from each other are advantageous in that one type of mold is required, which enables reduction in production costs, parts costs, and parts management costs.

Another Embodiment

The configuration of the present invention can be applied even to a flat head cover having no protruding cover portion 3A.

What is claimed is:

1. A head cover for an engine comprising:
a gas passage in the head cover that guides blow-by gas from a crankcase to an intake passage;
a gas outlet that is formed in a head cover wall at a terminal end portion of the gas passage in the head cover;
a gas intermediate outlet portion that is formed in the head cover wall so as to face space inside the head cover other than the gas passage in the head cover; and
a gas intermediate inlet portion that is formed in the head cover wall so as to face the gas passage in the head cover,
the gas passage in the head cover is configured of internal space of a box-shaped structure formed in a downward protruding state from the head cover wall,
the gas intermediate outlet portion is set to face an outside of the box-shaped structure, and the gas intermediate inlet portion is set to face an inside of the box-shaped structure,
the box-shaped structure is configured of a peripheral wall that protrudes downward from the head cover wall, and a bottom plate member that is screwed to a lower end edge of the peripheral wall, and a boss portion, in which a female thread portion for screwing a gas passage forming member in the head cover is formed, is provided upstream of the gas intermediate outlet portion in the head cover wall in a blow-by gas flow direction.

2. The head cover for an engine according to claim 1, wherein
in at least one of the gas intermediate outlet portion and the gas intermediate inlet portion, blow-by gas supply and discharge passages communicate with and connect to an engine exterior oil separator.

3. The head cover for an engine according to claim 1, wherein through holes penetrate the head cover wall for at least one of the gas intermediate outlet portion and the gas intermediate inlet portion.

4. The head cover for an engine according to claim 3, wherein the through holes are by post-processing after molding of the head cover.

5. The head cover for an engine according to claim 1, wherein an oil separator is arranged on an inner side of the head cover wall.

6. A manufacturing method for a head cover for an engine comprising:
a step of preparing a head cover that includes:
a gas passage in the head cover that guides blow-by gas from a crankcase to an intake passage;
a gas outlet that is formed in a head cover wall at a terminal end portion of the gas passage in the head cover;
a gas intermediate outlet portion that is formed in the head cover wall so as to face space inside the head cover other than the gas passage in the head cover; and
a gas intermediate inlet portion that is formed in the head cover wall so as to face the gas passage in the head cover,
a step of choosing between an opening specification and a closing specification, the opening specification being a specification in which through holes that penetrate the head cover wall are formed for the gas intermediate outlet portion and the gas intermediate inlet portion, and the closing specification being a specification in which the through holes are not formed for the gas intermediate outlet portion and the gas intermediate inlet portion;
a step of forming the head cover wall according to either the opening specification or the closing specification,
wherein the gas passage in the head cover is configured of internal space of a box-shaped structure formed in a downward protruding state from the head cover wall,
the gas intermediate outlet portion is set to face an outside of the box-shaped structure, and the gas intermediate inlet portion is set to face an inside of the box-shaped structure,
the box-shaped structure is formed of a peripheral wall that protrudes downwardly from the head cover wall; and a bottom plate member that is screwed to a lower end edge of the peripheral wall, and
a step of forming the head cover wall including a boss portion, in which a female thread portion for screwing a gas passage forming member in the head cover is formed, upstream of the gas intermediate outlet portion in the head cover wall in a blow-by gas flow direction, in the closing specification.

7. The manufacturing method for the head cover for the engine according to claim 6, comprising:
a step of forming the through holes such that, in at least one of the gas intermediate outlet portion and the gas intermediate inlet portion, blow-by gas supply and discharge passages communicate with and connect to an engine exterior oil separator in the opening specification, and
a step of forming the head cover so that an oil separator is arranged on an inner side of the head cover wall in the closing specification.

8. The manufacturing method for the head cover for the engine according to claim 6, comprising:
a step of forming the through holes by machine-processing after molding of the head cover.

9. The manufacturing method for the head cover for the engine according to claim 7, comprising:
a step of forming the through holes by machine-processing after molding of the head cover.

10. The manufacturing method for the head cover for the engine according to claim 7, comprising:
a step of forming the gas passage in the head cover of internal space of a box-shaped structure formed in a downward protruding state from the head cover wall, and
setting the gas intermediate outlet portion to face an outside of the box-shaped structure, and setting the gas intermediate inlet portion face an inside of the box-shaped structure.

11. The manufacturing method for the head cover for the engine according to claim 8, comprising:
a step of forming the gas passage in the head cover of internal space of a box-shaped structure formed in a downward protruding state from the head cover wall, and
setting the gas intermediate outlet portion to face an outside of the box-shaped structure, and setting the gas intermediate inlet portion to face an inside of the box-shaped structure.

12. The manufacturing method for the head cover for the engine according to claim 9, comprising:
a step of forming the gas passage in the head cover of internal space of a box-shaped structure formed in a downward protruding state from the head cover wall, and
setting the gas intermediate outlet portion to face an outside of the box-shaped structure, and setting the gas intermediate inlet portion to face an inside of the box-shaped structure.

13. The manufacturing method for the head cover for the engine according to claim 10 wherein the box-shaped structure is formed of a peripheral wall that protrudes downward from the head cover wall, and a bottom plate member that is screwed to a lower end edge of the peripheral wall.

14. The manufacturing method for the head cover for the engine according to claim 11, comprising:
wherein the box-shaped structure is formed of a peripheral wall that protrudes downward from the head cover wall, and a bottom plate member that is screwed to a lower end edge of the peripheral wall.

15. The manufacturing method for the head cover for the engine according to claim 12, comprising:
wherein the box-shaped structure is formed of a peripheral wall that protrudes downward from the head cover wall, and a bottom plate member that is screwed to a lower end edge of the peripheral wall.

16. The manufacturing method for the head cover for the engine according to claim 6, comprising:
   a step of using the head cover for which a pressure regulating valve is attached to one of the gas outlet and a head cover wall near the gas outlet.

17. The manufacturing method for the head cover for the engine according to claim 7, comprising:
   a step of using the head cover for which a pressure regulating valve is attached to one of the gas outlet and a head cover wall near the gas outlet.

18. The manufacturing method for the head cover for the engine according to claim 8, comprising:
   a step of using the head cover for which a pressure regulating valve is attached to one of the gas outlet and a head cover wall near the gas outlet.

19. The manufacturing method for the head cover for the engine according to claim 9, comprising:
   a step of using the head cover for which a pressure regulating valve is attached to one of the gas outlet and a head cover wall near the gas outlet.

* * * * *